United States Patent
Arilla et al.

(10) Patent No.: US 7,048,497 B2
(45) Date of Patent: May 23, 2006

(54) GAS TURBINE STATOR

(75) Inventors: Jean-Baptiste Arilla, Issy les Moulineaux (FR); Alain Galland, Melun (FR); Michel Gerard Paul Hacault, Massy (FR); Jean-Philippe Maffre, Dammarie les Lys (FR)

(73) Assignee: Snecma Moteurs, Paris (FR)

( * ) Notice: Subject to any disclaimer, the term of this patent is extended or adjusted under 35 U.S.C. 154(b) by 72 days.

(21) Appl. No.: 10/491,438

(22) PCT Filed: Nov. 7, 2002

(86) PCT No.: PCT/FR02/03805

§ 371 (c)(1),
(2), (4) Date: Apr. 13, 2004

(87) PCT Pub. No.: WO03/040524

PCT Pub. Date: May 15, 2003

(65) Prior Publication Data

US 2004/0247429 A1    Dec. 9, 2004

(30) Foreign Application Priority Data

Nov. 8, 2001  (FR) .................................. 01 14428

(51) Int. Cl.
*F01D 25/12*  (2006.01)
(52) U.S. Cl. ..................... 415/116; 415/180; 415/174.5

(58) Field of Classification Search ................ 415/116, 415/180, 115, 174.4, 174.5; 416/95, 96 R, 416/97 R See application file for complete search history.

(56) References Cited

U.S. PATENT DOCUMENTS

| 3,989,410 | A | 11/1976 | Ferrari |
| 4,466,239 | A | 8/1984 | Harris et al. |
| 4,822,244 | A | 4/1989 | Maier et al. |
| 5,245,821 | A | 9/1993 | Rieck, Jr. et al. |
| 5,402,636 | A | 4/1995 | Mize et al. |
| 5,575,616 | A | 11/1996 | Hagle et al. |
| 6,017,189 | A | 1/2000 | Marchi et al. |
| 6,773,225 | B1 * | 8/2004 | Yuri et al. ..................... 415/1 |
| 6,776,573 | B1 * | 8/2004 | Arilla et al. ................ 415/115 |

* cited by examiner

*Primary Examiner*—Edward K. Look
*Assistant Examiner*—Nathan Wiehe
(74) *Attorney, Agent, or Firm*—Oblon, Spivak, McClelland, Maier & Neustadt, P.C.

(57) ABSTRACT

A gas turbine stator including at least a first injector providing a passage for a main cooling air stream into a pressurized chamber. An evacuation mechanism discharges air coming from an internal labyrinth gland of a first cavity towards a lower-pressure second cavity. A second injector evacuates the air contained in the second cavity towards a main duct. The stator further includes a third injector designed to generate an overpressure close to the internal labyrinth gland in the pressurized chamber.

24 Claims, 4 Drawing Sheets

GAS TURBINE STATOR

TECHNICAL FIELD

The technical field of this invention is that of gas turbines, such as axial-flow turbine engines, comprising a stator notably intended to supply air to other elements of the gas turbine. This stator in particular, is a mechanical unit, which allows relatively cool air to be supplied to the blades of the high-pressure turbine, this air intended notably to cool a part of the rotor being drawn from the bottom of the combustion chamber.

STATE OF THE PRIOR ART

In well-known embodiments of gas turbine stators of the prior art, we usually find an element such as a main injector which makes it possible to accelerate the air drawn from a cavity in the stator, a retainer for guiding the air down to the blades of the high-pressure turbine, as well as different air circuits making it possible to calibrate all the airflows throughout the system. These airflows are then injected into different cavities consequently making it possible to limit the rise in temperature of the mechanical components. According to these different types of embodiments, widespread use is made of leakproof systems such as labyrinth glands to limit as much as possible the leakage of cool air.

FIG. 1 represents a longitudinal half section of a stator according to the prior art. The purpose of this stator is to draw cool air from the stator cavity 20, then deliver this air through sloping hole type injectors 21 which speed it up and adjust the direction of flow thereof. This cool air then arrives in a pressurised chamber 22 before entering into orifices 23 of the retainer so as to be directed towards the blades 24 of the rotor 34. This main cooling air stream is symbolised by the arrow A in FIG. 1. The arrow B symbolises the flow of discharge air coming from the internal labyrinth gland 35, intended to be re-injected into the main duct. Still referring to FIG. 1, we see that in order to allow this flow of discharge air we commonly use pipes 25 welded to different parts of the stator.

However, even though the labyrinth glands are commonly used to render the pressurised chamber leakproof, as notably disclosed in the document FR 2744761, these labyrinth glands cannot stop all the air leaks through this chamber. In particular, the internal labyrinth gland cannot stop some of the hot air present outside the pressurised chamber from penetrating into the latter. This consequently generates an increase in temperature of the pressurised chamber, and thus a reduction in the efficiency of the cooling system of the rotor.

OBJECT OF THE INVENTION

The aim of the invention is therefore to present a gas turbine stator resolving all the aforementioned inconveniences, thus implementing a device limiting as much as possible the leakage of hot air towards the inside of the pressurised chamber.

To accomplish this, the object of the invention is a gas turbine stator comprising:

a first injection means providing a passage for a main cooling air stream into a pressurised chamber;

a means for evacuating discharge air coming from an internal labyrinth gland of a first cavity towards a lower-pressure second cavity;

a second injection means for evacuating the air contained in said second cavity towards a main duct.

According to the invention, the stator is made in such a way that it further comprises a third injection means for generating an overpressure of air close to the internal labyrinth gland in said pressurised chamber.

The main advantage of this invention is the maximum limitation of hot air discharges, at the internal labyrinth gland heading towards the pressurised chamber. The limiting of these discharges slows down the increase in temperature in the inside of the pressurised chamber, thus making it possible to draw less cool air via the first injection means.

Preferably, the stator according to the invention is made so that the first injection means comprise at least one blade for producing a flow of air tangent to the rotor.

This configuration presents the advantage of bringing the air into excellent conditions, thus greatly reducing the rise in temperature due to the passage of air in the ducts. These rises in temperature are also limited due to the nature of the first injection means in the shape of blades with an appropriate aerodynamic profile, these means thus having identical behaviour to that of a conventional axial manifold.

The evacuation means used in this invention preferably comprise at least one piercing emerging on one hand into the first cavity and on the other hand into the second cavity.

According to this particular embodiment implementing piercings to allow for the evacuation of discharge air, an advantage of the invention resides in the reduction in manufacturing costs by using an existing part instead of adding pipes as per the prior art. This stator according to the invention also participates in the lightening of the injectors, as well as the lengthening of the service life of the stator due to the absence of welding of the pipes as is of common practice.

Preferably, the piercings implemented to accomplish the means of evacuating discharge air are carried out in the solid part of the blades constituting the first injection means.

According to a particular embodiment of the invention, the support of a part of the internal labyrinth gland comprises the first injection means. This support has a honeycomb structure alternatively made of cavities and blocks of material. The cavities are thus intended to lead to the evacuation means whereas the blocks of material comprise the third injection means.

Advantageously, the stator according to the invention can then have a crossover system for three flows of air assembled in a single part capable of being made in a single casting. We note that this particular configuration of the invention makes it simple to assemble the different elements of the stator.

BRIEF DESCRIPTION OF THE DRAWINGS

This description will be based on the annexed drawings among which.

DETAILED DESCRIPTION OF PREFERRED EMBODIMENTS

Figure 1:
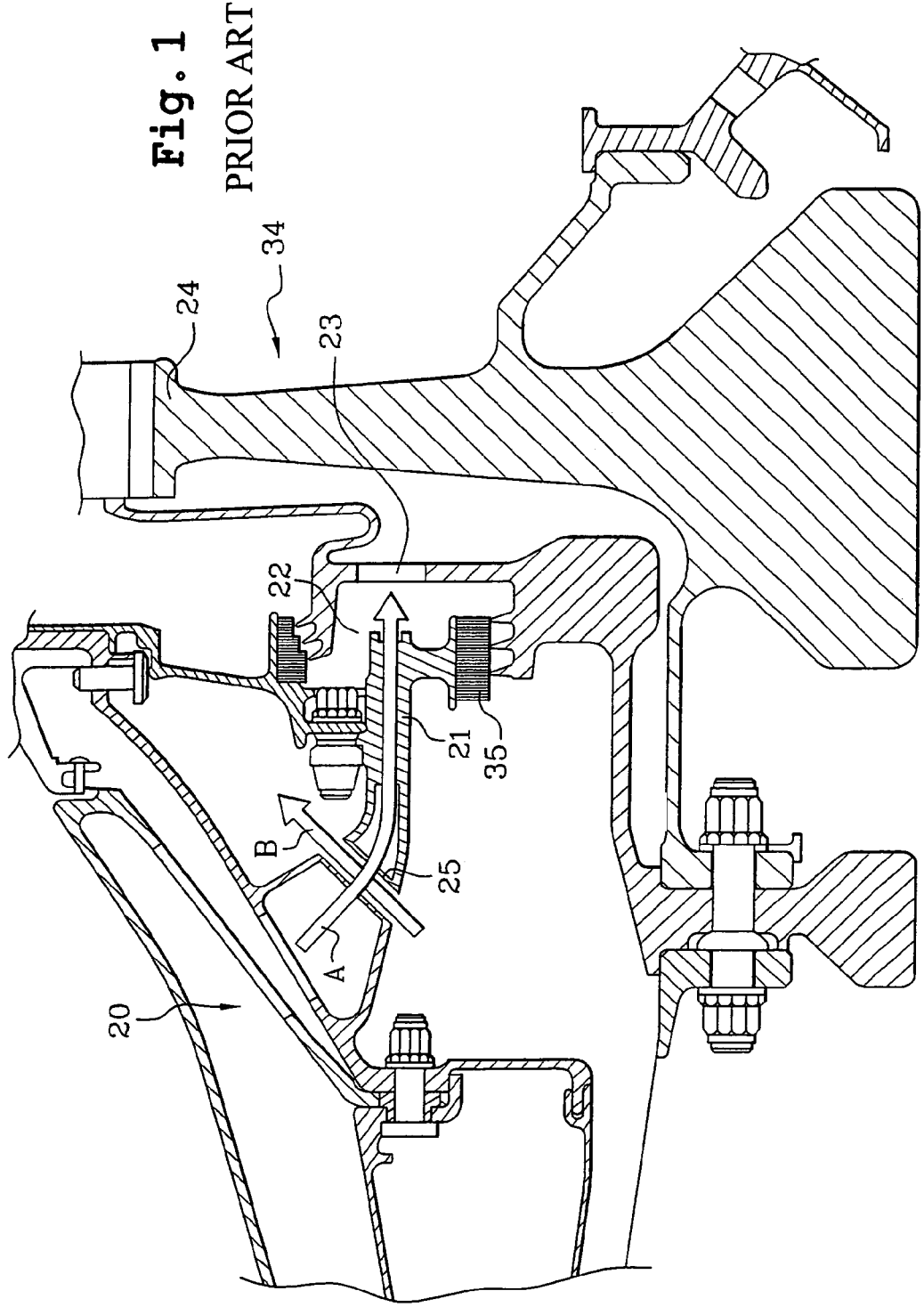
FIG. 1, previously described, illustrates the prior art.
Figure 2:
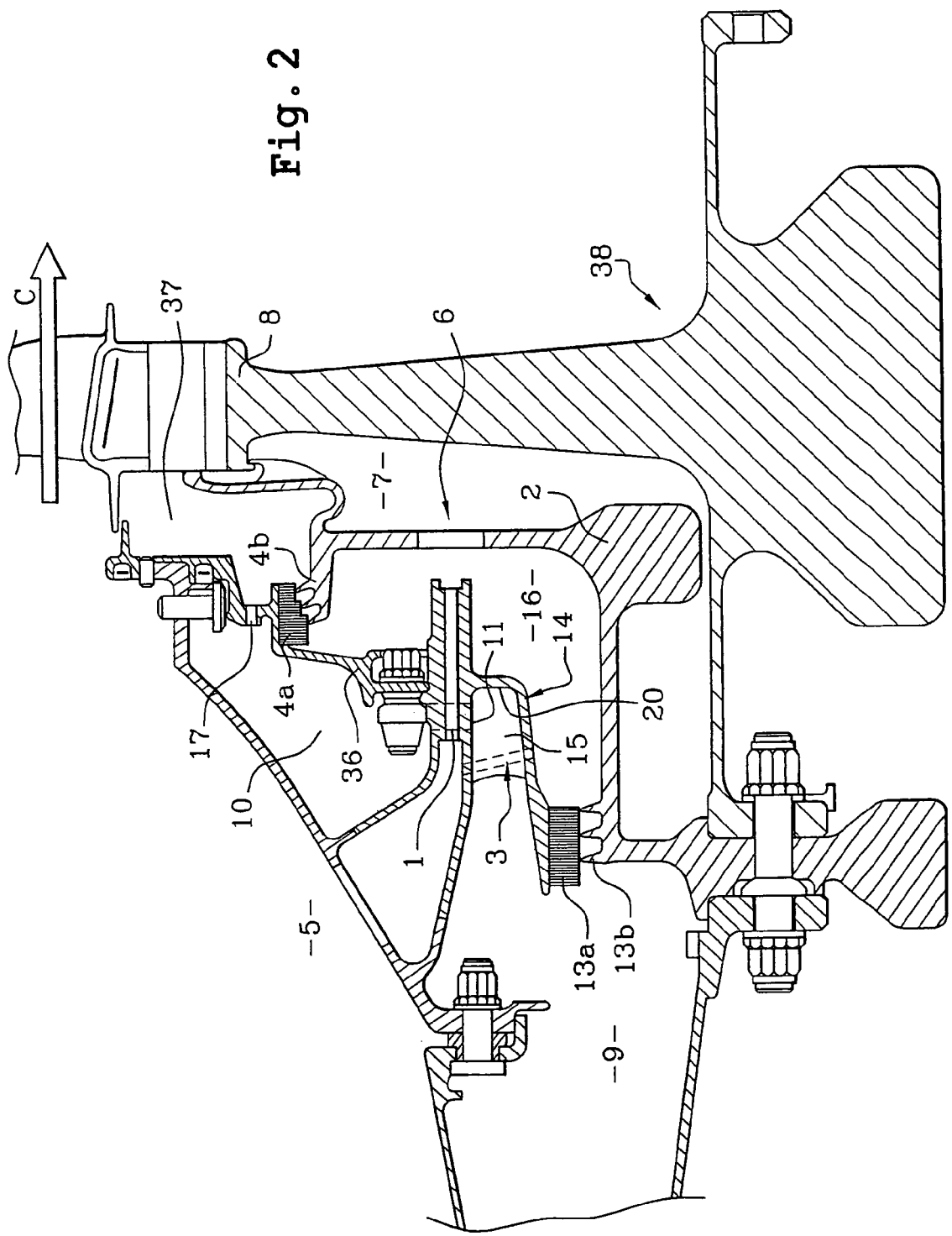
FIG. 2 represents a longitudinal half section of one part of a turbine engine in which is fitted the stator according to the invention.

In reference to FIG. 2, we see one part of a turbine engine notably comprising a stator according to the invention. This stator firstly comprises a pressurised chamber 16 delimited by different elements. Among these elements there is an external labyrinth gland 4a and 4b as well as an internal labyrinth gland 13a and 13b. These two internal and external labyrinth glands 13a, 13b, 4a and 4b are respectively held by a support 14 fixed to the wall of a stator cavity 5 and another support 36 fixed to this support 14. The internal labyrinth gland 13a and 13b partly delimits a boundary between the pressurised chamber 16 and a first cavity 9 adjacent to it, whereas the external labyrinth gland 4a and 4b partly delimits a boundary between the pressurised chamber 16 and a second cavity 10 also adjacent to it. The first and second cavities 9 and 10 are themselves separated by the support 14. It is to be noted that the stator has, downstream from the second cavity 10 in the direction of the flow of a main duct of the gas turbine represented by the arrow C in FIG. 2, a third cavity 37 separated from the second cavity 10 by the support 36.

The internal 13a, 13b, and external 4a and 4b labyrinth glands are generally broken down into at least one friction part 13a and 4a fixed to the stator via supports 14 and 36 and at least one lip 13b and 4b fixed to a retainer 2. This retainer 2 also delimits the pressurised chamber 16 and is fixed to a rotor 38 of the gas turbine. This retainer 2 comprises injection holes 6 emerging into a cavity 7 located between said retainer 2 and the rotor 38 of the gas turbine, the latter having blades 8.

The stator firstly comprises first injection means 1 achieved in the support 14 and making it possible to draw cool air from the stator cavity 5, so as to send it towards the blades 8 of the rotor 38. As in the devices of the prior art, this air passes through the first injection means 1 to enter the pressurised chamber 16, where a main cooling air stream transits before cooling the blades 8 of the rotor 38 passing through the injection holes 6 designed for this purpose in the retainer 2.

Once through the injection holes 6 the cold air fills the cavity 7 located between the retainer 2 and the rotor 38. This retainer 2 is to ensure the sending of this air down to the blades 8 of the rotor 38.

Still with reference to FIG. 2, the stator comprises means for evacuating discharge air coming from the internal labyrinth gland 13a and 13b so as to evacuate the air out of the first cavity 9 adjacent to the pressurised chamber 16, towards the second cavity 10 of lower pressure. These means of evacuating air can be fixed to the support 14.

Additionally, the stator comprises second injection means for evacuating air held in the second cavity 10 in order to re-inject it into the third cavity 37 so that it may rejoin the main duct of the gas turbine. These second injection means are located in the part of the support 36 that separates the second and third cavities 10 and 37.

According to the invention, the stator also comprises third injection means to generate an overpressure of air in the pressurised chamber 16, the local overpressure being located close to the internal labyrinth gland 13a and 13b. The purpose of these means is to hinder as much as possible the hot air of the first cavity 9 from escaping towards the pressurised cavity 16, so that the latter remains at an acceptable temperature. The purpose of these third injection means is to generate a local overpressure in the pressurised chamber 16 close to the internal labyrinth gland 13a and 13b in order to balance the pressures between this pressurised chamber 16 and said first cavity 9 itself being adjacent. The cool air drawn by these third injection means comes from the same stator cavity 5 as the air drawn by the first injection means 1 to generate the main cooling air stream.

The stator is equipped with first injection means 1 whose shape and manufacture greatly differ from prior embodiments. Indeed, in reference to FIG. 3, these injection means comprise at least one blade 12 making it possible to render the flow of air coming from the stator cavity 5 tangent to the rotor 38. These first injection means 1 are thus comparable to a conventional axial manifold, thus bringing the air under better conditions than if it had to pass through sloping piercings, as was commonly used in the past. The direct consequence of using such a device is the elimination of a bursting effect due to the jet on the retainer 2, a major source of temperature rise of the supply air to the blades. This bursting effect is the consequence of using sloping piercings to introduce the air into the pressurised chamber. Indeed, the slope of these piercings is insufficient to prevent the main air stream from being directly projected against the retainer 2. The collision between this flow of cool air and the retainer 2 results in the cool air in the pressurised chamber 16 unnecessarily heating up thus rendering the ventilation less efficient. It is to be specified that the invention could, however, use conventional first injection means, such as the sloping injection holes as previously disclosed.

Figure 3:
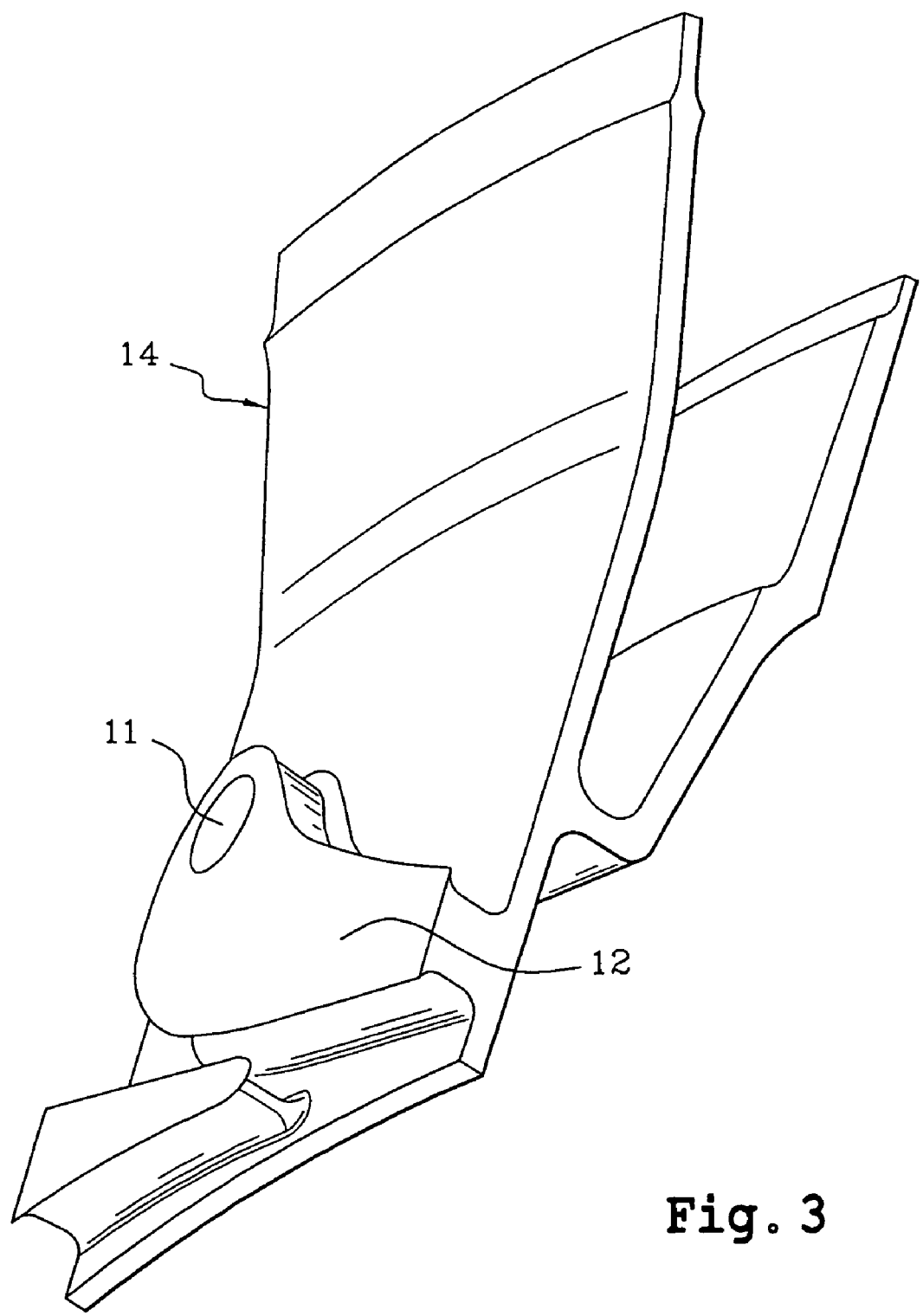
FIG. 3 represents a perspective partial view of the stator according to the invention emphasising the co-operation between the first injection means and the means for evacuating discharge air.

According to a particular embodiment of the invention, the means for evacuating discharge air preferably comprise at least one piercing 11 in the support 14, these piercings 11 emerging on one hand into the first cavity 9 and on the other hand into the second cavity 10. This further makes it possible to reduce the manufacturing costs by using an existing part to achieve these evacuation means, contrary to the solutions involving adding pipes and then welding them to different elements of the stator. Additionally, the incorporating of such a technical solution makes it possible to increase the service life of the stator due to the absence of the welding of the pipes. In the aforementioned embodiment of the first injection means 1, we can notably carry out these piercings 11 in a part of the blades 12. As can be seen in FIG. 3, the blades 12 are solid and can consequently contain these means for evacuating discharge air. The making of simple piercings in the material of these blades 12 thus makes it possible to compact the unit constituted by the first injection means 1 as well as the means for evacuating discharge.

With reference to FIG. 2, we see that all of these previously described three flows, namely the one coming from the first injection means 1, the one coming from the third injection means as well as the one coming from the means for evacuating discharge air, can exist within the same part.

To achieve this, it is then possible to adapt the support 14 so that it can receive these three flows. This support 14 is partly honeycombed, notably thanks to the presence of cavities 20 capable of directing the flow of air towards the evacuation means. The piercings 11 for the passage of air start in the cavities 20 and cross the blades 12 as previously described. Additionally, to achieve the honeycombed structure, these cavities 20 are set between blocks of material 15 in which the third injection means are made.

Furthermore, as the support 14 comprises the first injection means 1, we obtain a triple-flow stator, these flows crossing in the support 14 without any of them disturbing the smooth flowing of the others. This part of the stator can easily be made in a single casting. Additionally, the use of casting technology makes it possible to adjust the shapes of rotor 38, giving it a more compact appearance. This reduction in the overall size of the parts of the rotor 38 also leads to substantial reductions in manufacturing costs due to the restricted dimensions of these parts constituting the rotor 38.

The third injection means can be in the form of at least one piercing 3 through the blocks of material 15. These piercings are preferably sloping to obtain a flow of air with a large component tangent to the rotor 38, namely according to a perpendicular direction to the sectional plane in FIG. 2. It is also possible that these third injection means take the form of at least one blade to render the flow of air tangent to this rotor 38. These blades would then be of the same type as those of the first injection means represented in FIG. 3.

To evacuate the air in the second cavity 10 towards the main duct, there are the second injection means. As this is the case in reality, we can carry out at least one sloping piercing 17 in the stator so as to obtain a flow of air with a large component tangent to the rotor. These piercings 17 can be made in the support 36 between the second cavity 10 and the third cavity 37. Note that we can also resort to a blade system with the previously described thermal and mechanical effects. Additionally, the air coming from these second injection means can also be used to cool a zone of the rotor subject to high flow temperatures from the main duct.

Figure 4:
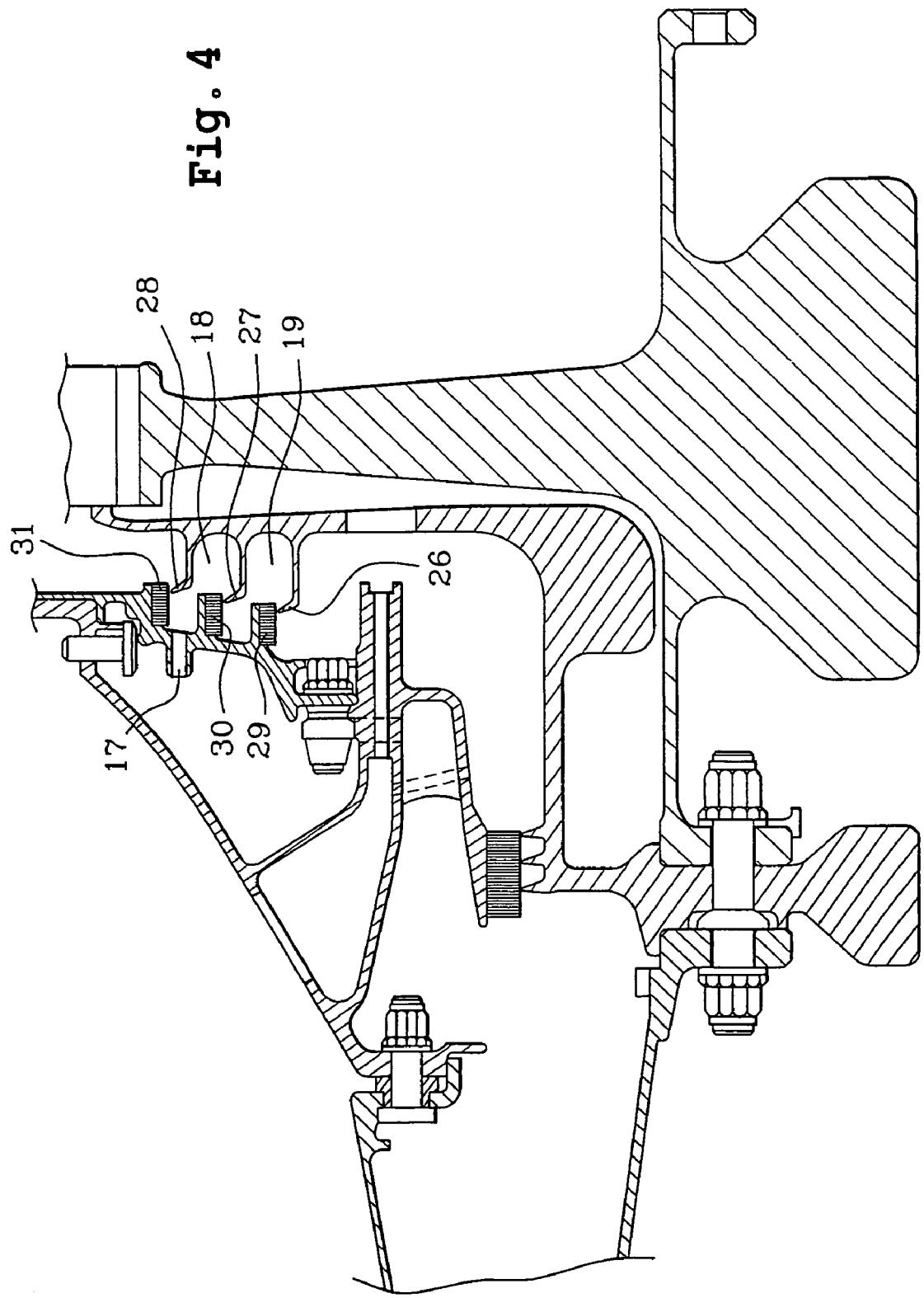
FIG. 4 represents a longitudinal half section of one part of a turbine engine in which is fitted the stator according to the invention, when this turbine engine uses a harpoon type retainer.

Likewise, the second injection means can also improve the efficiency of the rotating leakproof systems of the retainer 2. In reference to FIG. 4, the piercings 17 emerge into a cavity 18 of the external labyrinth gland. This case arises when a harpoon type retainer 2 is used, namely when the external labyrinth gland is made so that each lip 26, 27 and 28 works in conjunction with a distinct honeycomb type friction part 29, 30 and 31. Due to this particular layout we thus obtain at least two cavities 18 and 19 partially separated from the second cavity 10 by an element other than one of the honeycomb type friction parts 29, 30 and 31.

We can then inject air into one of these cavities 18 or 19 via the second injection means. This air swirls when arriving in the cavities 18 and 19 and is driven in rotation before being naturally sucked from the pressurised chamber 16 towards the main duct, due to the pressure difference between these elements. The injecting of hot air into one of these cavities 18 or 19 will thus allow a reduction in the cold air to be drawn from the first injection means 1 and consequently results in an improvement in the performance of the system. Also note that injecting air into the small cavity 18 created by the succession of two labyrinths increases the pressure of this small cavity and thus provokes an additional drop in the pressure difference between this cavity 18 and the pressurised chamber 16.

The main added benefit here lies in the use of a harpoon type external labyrinth gland. Indeed, this layout makes it possible to make the second injection means in a solid element, other than a honeycomb type friction element, which would disturb the air jet. The solution proves to be very advantageous in that it avoids the disturbances due to passing through honeycomb structures 29, 30 and 31, and in that it has fewer manufacturing constraints than the current solutions of the prior art.

The second injection means thus take the form of sloping piercings 17 to obtain a flow of air with a large component tangent to the rotor 38, or the form of blades such as those that can be used to make the first injection means 1. The overpressure generated in the small cavity 18 considerably reduces the discharge rates of the cooling circuit, with the consequence that more cold air coming from the first injection means manages to pass through the passage holes 6.

Another particularity of the invention lies in the specific layout of the support 14 and of the first injection means 1. Traditionally, the part of the support 14 holding the friction part 13*a* of the internal labyrinth gland 13*a* and 13*b* is placed under the air outlet of the first injection means 1. In this configuration, this part of the support 14 is then subject to minor displacements engendered by these first injection means 1, thus creating major discharges through the internal labyrinth gland 13*a* and 13*b*. To compensate for this inconvenience, the stator can then have, as can be seen in FIG. 2, a gap between the outlet of the first injection means 1 and the part of the support 14 holding the friction part 13*a*. This gap makes it possible to interpose between these two elements the third injection means, which also engender minor displacements of the support 14 holding the friction part 13*a*. It is thus possible to control the clearance in the internal labyrinth gland 13*a* and 13*b*, by decoupling the aforementioned two movements of the stator. Indeed, by adjusting the mass of the blocks 15, the air flow rates in the piercings 3 and the number of these piercings, it is thus possible to adjust the relative position of the rotor and the stator in order to limit as much as possible any eventual discharges through this internal labyrinth gland 13*a* and 13*b*.

The same is true of the external labyrinth gland 4*a* and 4*b*. Indeed it is possible to control the minor displacements of the support 36 holding the friction part 4*a*, by combining the effects of the inertia mass of this support 36 and the effects of the cooling generated by the sloping piercings 17 of the second injection means.

The third injection means also make it possible to obtain a top-up flow rate for the cooling air circuit of the blades, as well as stabilisation of the pressure in the pressurised chamber 16.

Finally, note that the support 36 of the friction part 4*a* is bolted from the inside, contrary to common practice, this technique making it possible to save space in the external part for the supporting of the manifold.

Naturally, various modifications can be made by a person skilled in the art to the device that has been described, solely as a non-restrictive example.

The invention claimed is:

1. A gas turbine stator comprising:
    first injection means for providing a passage for a main cooling air stream into a pressurized chamber;
    means for evacuating discharge air coming from an internal labyrinth gland partly delimiting the pressurized chamber of a first cavity towards a lower-pressure second cavity;
    second injection means for evacuating the air contained in said second cavity towards a main duct; and
    third injection means for generating an overpressure of air close to the internal labyrinth gland in said pressurized chamber,
    wherein the first injection means comprises at least one blade for generating a flow of air tangent to a rotor of the gas turbine,
    wherein the means for evacuating comprises at least one piercing emerging into the first cavity and into the second cavity, and
    wherein each piercing is made in a solid part of one of the blades.

2. A gas turbine stator set forth in claim 1, wherein the first injection means comprises at least one sloping hole for generating a flow of air with a large component tangent to a rotor of the gas turbine.

3. A gas turbine stator set forth in claim 1, wherein the means for evacuating comprises at least one piercing emerging into the first cavity and into the second cavity.

4. A gas turbine stator set forth in claim 1, wherein the internal labyrinth gland comprises at least one friction part, each friction part being held by a support in which is located the first injection means, the support being honeycombed by cavities and blocks of material, the cavities configured to lead to the means for evacuating discharge air and the blocks of material configured to comprise the first, second, and third injection means.

5. A gas turbine stator set forth in claim 4, wherein the third injection means comprises at least one piercing made through the blocks of material.

6. A gas turbine stator set forth in claim 5, wherein at least one piercing is made sloping to produce a flow of air with a large component tangent to a rotor of the gas turbine.

7. A gas turbine stator set forth in claim 1, wherein the third injection means comprises at least one blade for generating a flow of air tangent to a rotor of the gas turbine.

8. A gas turbine stator set forth in claim 1, wherein said second injection means comprises at least one sloping piercing for producing a flow of air with a large component tangent to a rotor of the gas turbine.

9. A gas turbine stator set forth in claim 1, wherein said second injection means comprises at least one blade for producing a flow of air tangent to a rotor of the gas turbine.

10. A gas turbine stator set forth in claim 1, wherein the pressurized chamber is delimited by a harpoon external labyrinth gland, creating at least two cavities, each of the two cavities being partly separated from the second cavity by a solid element, said second injection means emerging into at least one of the two cavities being made in the solid element.

11. A jet engine, comprising the gas turbine stator as set forth in claim 1.

12. A gas turbine stator comprising:
    first injection means for providing a passage for a main cooling air stream into a pressurized chamber;
    means for evacuating discharge air coming from an internal labyrinth gland partly delimiting the pressurized chamber of a first cavity towards a lower-pressure second cavity;
    second injection means for evacuating the air contained in said second cavity towards a main duct; and
    third injection means for generating an overpressure of air close to the internal labyrinth gland in said pressurized chamber,
    wherein the pressurized chamber is delimited by a harpoon external labyrinth gland, creating at least two cavities, each of the two cavities being partly separated from the second cavity by a solid element, said second injection means emerging into at least one of the two cavities being made in the solid element.

13. A gas turbine stator set forth in claim 12, wherein the first injection means comprises at least one blade for generating a flow of air tangent to a rotor of the gas turbine.

14. A gas turbine stator set forth in claim 13, wherein the means for evacuating comprises at least one piercing emerging into the first cavity and into the second cavity.

15. A gas turbine stator set forth in claim 14, wherein each piercing is made in a solid part of one of the blades.

16. A gas turbine stator set forth in claim 13, wherein the means for evacuating comprises at least one piercing emerging into the first cavity and into the second cavity.

17. A gas turbine stator set forth in claim 12, wherein the first injection means comprises at least one sloping hole for generating a flow of air with a large component tangent to a rotor of the gas turbine.

18. A gas turbine stator set forth in claim 12, wherein the internal labyrinth gland comprises at least one friction part, each friction part being held by a support in which is located the first injection means, the support being honeycombed by cavities and blocks of material, the cavities configured to lead to the means for evacuating discharge air and the blocks of material configured to comprise the first, second, and third injection means.

19. A gas turbine stator set forth in claim 18, wherein the third injection means comprises at least one piercing made through the blocks of material.

20. A gas turbine stator set forth in claim 19, wherein at least one piercing is made sloping to produce a flow of air with a large component tangent to a rotor of the gas turbine.

21. A gas turbine stator set forth in claim 12, wherein the third injection means comprises at least one blade for generating a flow of air tangent to a rotor of the gas turbine.

22. A gas turbine stator set forth in claim 12, wherein said second injection means comprises at least one sloping piercing for producing a flow of air with a large component tangent to a rotor of the gas turbine.

23. A gas turbine stator set forth in claim 12, wherein said second injection means comprises at least one blade for producing a flow of air tangent to a rotor of the gas turbine.

24. A jet engine, comprising the gas turbine stator as set forth in claim 12.

* * * * *